Nov. 28, 1933.  H. P. SPARKES  1,936,774
SYNCHRONIZING EQUIPMENT
Filed April 12, 1932

WITNESSES
E C Leiding
A A Steinmiller

INVENTOR
Harry P. Sparks.
BY
ATTORNEY

Patented Nov. 28, 1933

1,936,774

UNITED STATES PATENT OFFICE 1,936,774

SYNCHRONIZING EQUIPMENT

Harry P. Sparkes, West Orange, N. J., assignor to Westinghouse Electric & Manufacturing Company, a corporation of Pennsylvania Application April 12, 1932. Serial No. 604,855

13 Claims. (Cl. 172—245)

My invention relates to synchronizing equipment and relates particularly to means for indicating and controlling the phase relation of electrical quantities or characteristics in a plurality of sections or circuits of a distribution system.

It is an object of my invention to provide a single instrument or unit for indicating simultaneously and controlling automatically the phase relation of electrical quantities in a plurality of sections of an electrical system.

Another object of my invention is to provide photo-sensitive means operably-responsive to an image imposed thereon from a stroboscopic device, for effecting automatically a control operation.

It is essential that the system operator at a central generating station of an electrical distribution system be able to observe readily the phase-angle relation between the voltages in various supply circuits and the system voltage, in order that he may initially connect a circuit to the system at the time that the voltage in the circuit is in phase with the system voltage, that is, synchronized with it, as well as for the purpose of controlling the phase-angle relation and frequency of voltages at various portions or sections of the system.

My invention comprises a simple and compact device for enabling a system operator to observe on a single objective or dial the phase-angle relation between the voltages at a plurality of sources in a system and that of the system itself at the generating station. I employ a plurality of means such as tubular-glass space-discharge lamps which are illuminated only above a predetermined voltage and which, therefore, become alternately illuminated and darkened at a frequency corresponding to the frequency of the voltage source in accordance with which they are energized. By forming these space-discharge lamps into substantially circular configuration and disposing them adjacently for cooperation with a stroboscopic means, an image is obtained corresponding to each voltage source, which image indicates by a stationary position thereof, the phase-angle of that voltage, and which indicates by its movement the frequency of that voltage compared to that of the other voltage.

In practice, each of the tubular lamps is energized in accordance with the electrical characteristics of a different voltage source in various parts or sections of a distribution system, one of the tubes being energized in accordance with the system voltage at the central station. The energization of all of the tubes is effected by direct connection to the voltage sources themselves, in the event that the voltages are suitable for imposition on the lamps, or by indirect connection in the event that such voltage is not suitable for imposition on the lamps or in the event that the voltage source is at a remote point in the distribution system. Indirect connection of the tubular lamps to voltage sources is effected through the medium of telephone circuits and suitable amplifying and transformation means.

A variation in the color of the lamps, enables the various voltage sources to be readily identified and the characteristics thereof compared to those of the system voltage.

A stationary rainbow-image is an indication that the voltages at the various sources are in synchronism, that is, in phase with each other and that of the system.

Any fixed angular displacement of a color-image from the rainbow image indicates the exact phase-angle relation between the voltage at a source, corresponding to the displaced image, and the voltage of the system.

A variation in the frequency at a source from the system frequency causes the corresponding color-image to rotate in either a clockwise or counter-clockwise direction, depending upon whether the frequency at the source is greater or less than that of the system.

I dispose a plurality of photo-sensitive devices, such as photo-electric cells, in radial rows arranged at a predetermined angle with respect to the position of the image designating the phase-angle of the system voltage. The photo-electric cells are thus adapted to be operably responsive to the light emitted from the stroboscopic image or parts thereof in the event that the image or part thereof moves from its zero or system phase-angle position.

By employing suitable amplifying means, the energization of the photo-electric cells may be employed to effect automatically various control operations, such as, for example, the energization of the trip coil of a circuit-breaker, whereby a circuit having a voltage out of phase with the system voltage may be disconnected from the system.

My invention will be described in greater detail hereinafter in connection with the accompanying drawing, illustrating one embodiment thereof, wherein.

Figure 1:
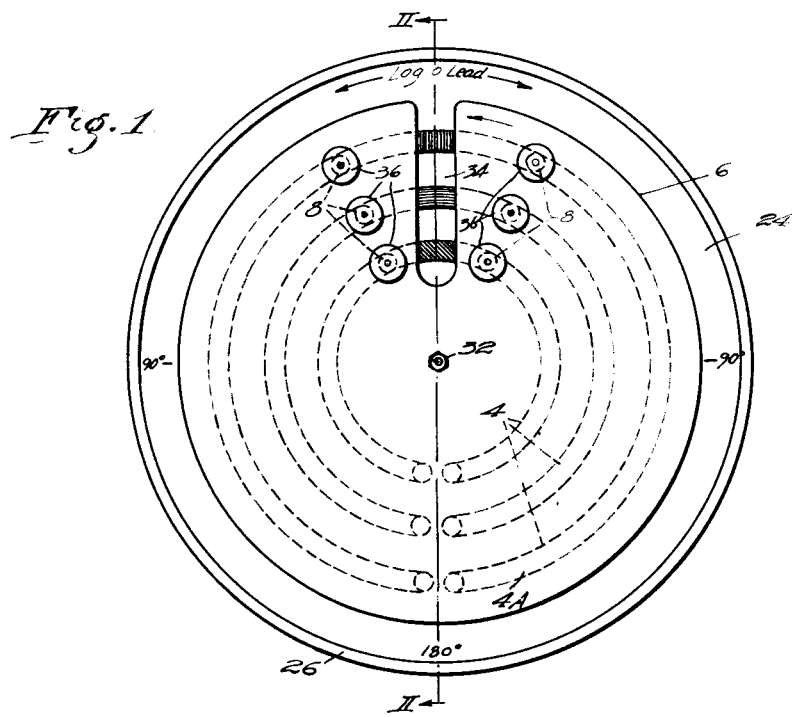
Figure 1 is a view in front elevation of an instrument embodying my invention.
Figure 2:
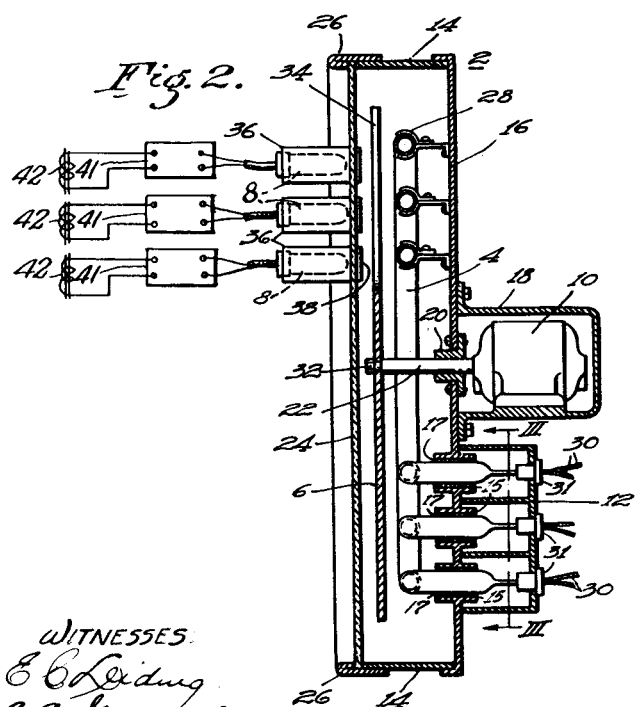
Fig. 2 is a view taken along the line II—II of Fig. 1.
Figure 3:
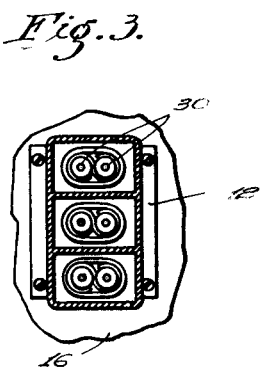
Fig. 3 is a view taken along the line III—III of Fig. 2.

The device comprises, in general, a supporting casing 2, a plurality of circularly-formed concentrically disposed tubular glass lamps 4 of the gas-filled discharge type, such as neon lamps, and a rotatable disc 6 disposed in parallel relation with respect to the plane of the lamps within the casing, as well as a plurality of photosensitive means, such as photo-electric cells 8, and a constant-speed motor, such as a motor of the synchronous type and terminal means 12 for the lamps preferably carried by the casing.

The casing 2 may be of any suitable composition or construction but is preferably made of sheet material having a cylindrical portion 14 enclosed on one end by a back supporting wall 16 provided with a suitable enclosed support 18 secured at the central axis thereof for supporting the motor 10 and provided with a suitable bearing or bushing member 20 to permit the shaft 22 of the motor to extend therethrough into the area surrounded by the cylindrical portion.

A sheet or disc 24 of frosted or ground glass encloses the other end of the casing and is secured to the cylindrical portion 14 by a suitable retaining rim 26.

The lamps 4 are preferably of a glass-tube type bent into substantially complete circular form and having the opposite ends thereof adjacently disposed and bent at right angles to the plane of the tube in order to effect in a simple manner the electrical connections thereto. The ends of the tubes project through suitable openings 15 in the back wall 16 into the terminal means 12 and are separated from contact with the wall 16 by spacer bushings 17 of suitable material such as felt, fiber, or cement.

Any number of lamps may be provided, depending upon the number of voltage sources which it is desired to observe in one instrument. The tubes 4 are successively larger or smaller in circular diameter and are secured in concentric relation with respect to the axis of the shaft 22 of the motor 10, by means of suitable supporting clamps or clips 28 securing them to the back wall 16 of the casing 2. All of the lamps are preferably of such character as to emit different or contrasting uni-colored light rays, such as red, blue and green, in order to facilitate the observation and identification of a particular voltage source. A pair of terminal leads 30 is provided for each of the lamps for making connections thereto and suitable insulating bushings 31 provide a support as well as a passage for the leads through the wall of the terminal means 12.

The disc 6 is secured in coaxial relation to the shaft 22 of the motor 10, in any suitable manner, such as, for example, by providing the disc 6 with a polygonal hole at the axis thereof and a reduced cross-sectional portion on the shaft 22 corresponding thereto, the end of the shaft 22 being threaded and provided with a nut 32 for maintaining the disc in contact with a shoulder formed by the reduced portion at the end of the shaft 22. Any other suitable method may be employed for securing the disc 6 to the shaft 22 which ensures non-relative movement therebetween. It is essential that there be no relative movement between the disc and the shaft 22 in order that the disc may move at all times in absolute accordance with the movement or rotation of the shaft 22.

The disc 6 may be of any suitable opaque sheet material, such as metal, hard rubber, or the like. A radially-disposed slot or opening 34 is provided therein which extends inwardly toward the axis of the disc from the outer periphery thereof a distance substantially equivalent to the radial distance from the outer periphery of the outermost concentric tubular lamp 4 to the inner periphery of the innermost tubular lamp in order to provide visual access to the tubular lamps 4 from the front of the casing 2 looking through the frosted glass 24. The disc 6 may also be of glass rendered opaque except over an area corresponding to that of the slot which remains transparent.

The frosted glass 24 is provided on the outside face thereof with suitable figures or characters around the periphery thereof adjacent the ring 26 for indicating the angular displacement of an image with respect to a predetermined zero position corresponding to the standard or system voltage phase-angle. The frosting of the glass 24 effects a proper diffusion of light and renders the color-images emitted from the tubes 4 distinct in outline.

The photo-electric cells 8 are suitably secured in opaque shields 36 mounted in holes or openings extending through the frosted glass 24, which have the open ends 38 thereof in close parallel-plane relation to the face of the disc. This construction excludes sufficient extraneous light so that the cells are responsive to only the light from the lamps 4. As will be observed in Fig. 1, the photo-electric cells 8 are disposed in radially-disposed rows occupying predetermined angular positions on opposite sides of the zero position, each of the rows having a cell in alignment with each corresponding tubular lamp 4. Although Fig. 1 illustrates only two rows of photo-electric cells, it should be understood that other rows disposed in different angular relation with respect to the zero position may be employed for effecting additional control operations or operations different from those effected by the photo-electric cells shown.

The motor 10 is of any suitable constant-speed type, such as a synchronous motor, and it is energized from the system source of voltage to rotate at a speed in accordance with the electrical characteristics thereof.

The above construction may be modified in that the tubular lamps may be of substantially equal diameters and disposed coaxially with respect to each other and a surrounding rotatable cylindrical member of suitable width which corresponds to the disc 6.

During the operation of the above-described device, the lamps 4 are each energized in accordance with separate voltage sources at various parts or sections of the distribution system, one of the lamps, such as the lamp 4A, being energized in accordance with the electrical characteristics of the central station system source of voltage to serve as a standard.

If the voltage at the various sources is insufficient to operate the tubular lamps, suitable step-up transformers may be employed. If the voltage sources are at remote points in the distribution system, suitable telephone circuits for transmitting the frequency thereat to the central station may be employed in connection with suitable amplifying means and step-up transformers for the purpose of impressing the proper voltage on the tubular lamps corresponding thereto. In order to ensure the fact that the frequency and phase-angle position of the voltage taken from remote sources in the distribution system may be identical at the central station with that at the remote source, suitable telephone circuit balancing equipment of well-known construction may be employed.

It will be understood that with the lamps properly energized as previously described and the motor 10 rotating at synchronous speed corresponding to the system frequency at the central station, a stationary image emitted from tube 4A is visible through the frosted glass 24 of the instrument in alignment with the zero position indicated or marked preferably at the top of the frosted glass 24 in vertical alignment with the shaft 22 of the motor 10.

Assuming that the frequency of the system voltage at the central station is sixty cycles per second and that the motor 10 is provided with the proper number of poles so that it rotates at 3600 revolutions per minute, it will be clear that the light-image of characteristic color emitted from the tubular lamp 4A will remain stationary in the zero position because the radial slot 34 makes one complete revolution in one-sixtieth of a second, which is the interval of time occurring between maximum voltages of corresponding polarity in one cycle of a sixty-cycle frequency.

Due to the fact that the slot 34 in the disc 6 rotates one-half of a revolution in 1/120 of a second under the above assumed speed of rotation of the motor 10, a second image, the colors of which are disposed in inverse relation diametrically opposite to the first image, will appear, although due to the separation of the ends of the tubular lamps in this position, the image may not be as distinct as the first image.

It should be clear that, as long as the motor 10 rotates the disc 6 in synchronism with the energization of the tubular lamp 4A, the images that will appear will correspond in position and number to those described for 60-cycle energization, regardless of the frequency.

If the electrical characteristics or quantities, that is the frequency and the phase-angle, of the voltage corresponding to that of the various sources, which is impressed on the remainder of the tubular lamps 4, are exactly in phase with those of the standard of characteristics indicated by the image emitted from lamp 4A, a succession of different colored bars or spots of light will appear in radial alignment with the image emitted from the lamp 4A. Thus an image will appear and remain stationary in the zero position for a synchronous relation of the voltages at the various sources. Due to the fact that frosted glass is employed for the dial front 24, the bars or spots of color images are sharply and distinctly outlined.

If the phase-relation of the voltages taken from one of the sources varies with respect to the standard of the voltage in the system, the color image corresponding to that source will move, assuming a counter-clockwise rotation of the disc 6, in a counter-clockwise direction or a clockwise direction from the standard image depending upon whether the voltage at the source lags or leads the system voltage.

Assuming that the voltage from a source corresponds exactly in frequency to that of the standard frequency of the system and that the voltage phase-angle thereof alone differs from the standard voltage phase-angle, then the color image corresponding to that source will move to an angular position with respect to the zero position indicated on the instrument and remain stationary thereat, indicating the corresponding number of electrical degrees difference between the phase-angle of the standard system voltage and that of the voltage from the source.

The characters or number of degrees indicated on the frosted sheet glass front 24 of the instrument thus indicate directly the phase-angle relation between any of the voltages from a plurality of sources with respect to each other and with respect to that of the system.

If the frequency of the voltage from a certain source increases or decreases from that of the standard frequency of the system, the color-image corresponding to that source will rotate in a clockwise or counter-clockwise direction, respectively, assuming a counter-clockwise direction of rotation of the disc 6.

If all of the color-images, corresponding to all of the sources, move simultaneously to a predetermined position and remain in stationary alignment, while the color-image corresponding to the system voltage at the central station remains stationary at an angle thereto, this will be an indication that the system frequency at the central station has varied from its previous standard of value.

It will be clear that the number of images may be increased to some multiple of two by proportionally reducing the speed of rotation of the disc 6. For example, if the speed of the disc for 60-cycle frequency is 1800 revolutions per minute, four rainbow images will appear in quadrature relation with respect to each other.

Likewise, if the speed of the disc is proportionally increased, the number of images may be reduced. However, due to the fact that for a 60-cycle frequency, the motor 10 would have to rotate at a speed of 7200 revolutions per minute, it is impractical, in the present stage of the motor art to reduce the number of images in this manner: Only one image may be obtained, if desired, by disposing a suitable screen between the disc and the lower portion of the tubular lamps and thus rendering only the one upper image visible. However, due to the fact that the above described images are at opposite extremities of a diameter, no confusion or other bad effect results from the presence of the second image.

Assuming that the color-image corresponding to a voltage from a certain source or circuit moves to a predetermined angle at which a photo-electric cell 8 is disposed, the light therefrom effects the energization of that cell. By means of suitable amplifying devices 41 of well-known construction, the energization of any of the photo-electric cells may be employed to effect any control operation, such as effecting the energization of a tripping coil 42 for a circuit-breaker of well known construction connecting that circuit with the distribution system. The energization of the photo-electric cells may also effect desirable automatic control features for negative phase-sequence systems, through the medium of suitable amplifying and control equipment.

It should be understood, however, that my invention is not limited in the scope of its application to the particular illustrations described, because there are many other applications to which it may be adapted and applied. It should especially be understood that the term "stroboscopic" as employed herein and in the claims, is definitive of any suitable means for intermittently or periodically viewing an object and is not limited to a rotating means.

It will be seen, therefore, that I have provided a single instrument for indicating, as well as controlling, the phase-relation of electrical quantities in a plurality of sections of a distribution system.

It will be seen also that I have provided a novel device for automatically effecting control operations upon a departure from standard electrical conditions or characteristics.

It is understood that my invention is capable of various modifications without departing from the spirit thereof and I do not desire, therefore, that my invention be limited in scope except as necessitated by the prior art and as defined in the appended claims.

I claim as my invention:

1. In combination, a light source energizable in accordance with the electrical characteristics of an A. C. voltage source, at least one other light source energizable in accordance with at least one other corresponding A. C. voltage source, and stroboscopic means cooperable with both of said energizable light sources and movable in accordance with the electrical characteristics of one of the A. C. voltage sources, for creating images indicative of the relation of the electrical characteristics of the various voltage sources.

2. The combination in a unitary structure of a plurality of elements each energizable to produce visible manifestations in accordance with the frequency of a different alternating current source, corresponding respectively thereto, stroboscopic means cooperable therewith for producing images indicative of the relation of the electrical characteristics of the various sources, and frequency responsive means for moving said stroboscopic means.

3. In combination, an elongated tubular space-discharge element of substantially circular configuration energizable in accordance with the electrical characteristics of a source of voltage, stroboscopic means cooperable with said element and means for rotating said stroboscopic means in accordance with the electrical characteristics of another source of voltage, for producing an image indicative of the phase-angle relation between the voltages at the two sources.

4. The combination in a unitary structure of a plurality of adjacently disposed tubular space-discharge elements of substantially circular configuration each energizable in accordance with the electrical characteristics of one of a plurality of different voltage sources corresponding respectively thereto, stroboscopic means cooperable with said elements and means for rotating said stroboscopic means for producing an image for each of said elements which bears an angular relation to the other images corresponding to the phase-angle relation of the voltages at the various sources thereof.

5. The combination in a unitary structure of a plurality of concentrically disposed tubular space-discharge elements of substantially circular configuration each energizable in accordance with the electrical characteristics of one of a plurality of different sources of voltage corresponding respectively thereto, stroboscopic means including an opaque rotatable member having a radially elongated transparent portion, for cooperating with said space-discharge elements to produce a plurality of images one for each of said elements said images being positioned correspondingly to the phase-angle relation of the voltages at the various sources thereof, and motive means for rotating said stroboscopic means in accordance with a corresponding electrical characteristic of a source of voltage.

6. The combination in a unitary structure of a plurality of gas-discharge elements each energizable in accordance with the electrical characteristics of one of a plurality of different sources of voltage corresponding respectively thereto to emit uni-colored light rays, the rays from the various elements differing in color, and movable stroboscopic means cooperable with said elements for producing a plurality of images of different color which in color and relative position are indicative of the relation of the electrical characteristics of the respective sources of voltage corresponding thereto.

7. In combination, means including a plurality of spaced light sources disposed in cooperating relation to stroboscopic means for producing a plurality of light-images each positioned in accordance with the phase-angle of one of a plurality of different voltages corresponding respectively to said images, and means operably responsive to the attainment of a predetermined position by any of said light-images for controlling the corresponding voltage.

8. In combination, a flashing light source energizable in accordance with the electrical characteristics of a voltage source, stroboscopic means cooperable with said flashing light source and actuable in accordance with the electrical characteristics of another voltage source, for producing an image indicative of the relation of the electrical characteristics of the two voltage sources, and photo-sensitive means operably responsive to the imposition thereon of the image produced.

9. In combination, a plurality of elongated light sources each energizable in accordance with the electrical characteristics of one of a plurality of different voltage sources corresponding respectively thereto, movable stroboscopic means cooperable with said light sources for producing a plurality of images, each corresponding to one of the voltage sources and indicative of the relation of the electrical characteristics of its corresponding voltage source and those of the other voltage sources, and photo-sensitve means operably responsive to the imposition thereon of any of the images produced.

10. In combination, a plurality of space-discharge elements of substantially circular configuration disposed in adjacent relation, each of said elements being energizable in accordance with the electrical characteristics of one of a plurality of different voltage sources corresponding respectively thereto to emit rays of light, stroboscopic means including a rotatable member for controlling the visibility of the light rays from said elements and producing thereby a plurality of light-images each indicative of the relation of the electrical characteristics of the voltage source corresponding thereto and those of the other voltage sources, and a plurality of rows of angularly spaced photo-sensitive devices, each row having a photo-sensitive device corresponding to one of said elements and operably responsive to the imposition thereon of light rays therefrom.

11. In combination, a disk having a radial slot, a space-discharge lamp including a tubular portion substantially parallel to the plane of the disk adjacent to one side thereof opposite the slot and describing a substantially arcuate curve about the axis of the disk, and a synchronous motor for rotating the disk about its axis.

12. In combination an elongated light emitting element energizable in accordance with a recurring characteristic of an A. C. voltage source to be observed, a movable opaque member for screening said element and an elongated transparent area in said member for exposing a portion of said element in accordance with the position of the movable member at the instants when said element is energized, and means for moving said member in accordance with a recurring characteristic of an A. C. voltage source to be compared with said first source.

13. In combination a plurality of circular light emitting elements energizable in accordance with recurring characteristics of respective A. C. voltage sources to be observed, said elements being concentrically disposed and having different color characteristics, a synchronous motor having one end of its shaft disposed through the common center of said circular elements, a disk of opaque material disposed on the shaft of said motor parallel to the plane of said concentric elements and a radial transparent slot in said disk for exposing a restricted arc of said elements.

HARRY P. SPARKES.